United States Patent
Fukasawa et al.

(10) Patent No.: US 9,859,552 B2
(45) Date of Patent: Jan. 2, 2018

(54) ELECTRODE MATERIAL FOR NONAQUEOUS ELECTROLYTE SECONDARY BATTERY, ELECTRODE FOR NONAQUEOUS ELECTROLYTE SECONDARY BATTERY, AND NONAQUEOUS ELECTROLYTE SECONDARY BATTERY

(71) Applicant: KABUSHIKI KAISHA TOSHIBA, Minato-ku, Tokyo (JP)

(72) Inventors: Takayuki Fukasawa, Kanagawa (JP); Kenji Essaki, Kanagawa (JP); Tomokazu Morita, Chiba (JP); Takashi Kuboki, Tokyo (JP); Mitsuhiro Oki, Kanagawa (JP); Yasuhiro Goto, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 174 days.

(21) Appl. No.: 14/478,138

(22) Filed: Sep. 5, 2014

(65) Prior Publication Data
US 2015/0086870 A1   Mar. 26, 2015

(30) Foreign Application Priority Data

Sep. 20, 2013   (JP) ................. 2013-195036

(51) Int. Cl.
*H01M 4/134*   (2010.01)
*H01M 4/62*   (2006.01)
(Continued)

(52) U.S. Cl.
CPC ........... *H01M 4/134* (2013.01); *H01M 4/131* (2013.01); *H01M 4/136* (2013.01); *H01M 4/366* (2013.01);
(Continued)

(58) Field of Classification Search
CPC ...... H01M 4/134; H01M 4/366; H01M 4/486; H01M 4/62; H01M 4/625; H01M 4/622; H01M 4/131; H01M 4/136; H01M 4/485
See application file for complete search history.

(56) References Cited

U.S. PATENT DOCUMENTS 6,235,427 B1   5/2001   Idota et al.
7,303,838 B2   12/2007   Morita et al.
(Continued)

FOREIGN PATENT DOCUMENTS

CN   1374712 A   10/2002
CN   103107315 A   5/2013
(Continued)

OTHER PUBLICATIONS

Korean Office Action dated Sep. 17, 2015 from corresponding Korean Patent Application No. 10-2014-0117655, 7 pages.
(Continued)

*Primary Examiner* — Kenneth Douyette
(74) *Attorney, Agent, or Firm* — Ohlandt, Greeley, Ruggiero & Perle, L.L.P.

(57) ABSTRACT

An electrode material for nonaqueous electrolyte secondary battery of an embodiment includes a silicon nanoparticle, and a coating layer coating the silicon nanoparticle. The coating layer includes an amorphous silicon oxide and a silicon carbide phase. At least a part of the silicon carbide phase exists on a surface of the silicon nanoparticle.

20 Claims, 6 Drawing Sheets

(51) Int. Cl.
*H01M 4/36* (2006.01)
*H01M 4/38* (2006.01)
*H01M 4/131* (2010.01)
*H01M 4/136* (2010.01)
*H01M 4/485* (2010.01)
*H01M 4/58* (2010.01)

(52) U.S. Cl.
CPC ........... *H01M 4/386* (2013.01); *H01M 4/485* (2013.01); *H01M 4/58* (2013.01); *H01M 4/62* (2013.01); *H01M 4/625* (2013.01); *H01M 2220/30* (2013.01)

(56) References Cited

U.S. PATENT DOCUMENTS

| | | | |
|---|---|---|---|
| 2002/0164479 A1 | 11/2002 | Matsubara et al. | |
| 2004/0142242 A1* | 7/2004 | Kawase | H01M 4/0404 429/245 |
| 2005/0031958 A1 | 2/2005 | Fukuoka et al. | |
| 2006/0003227 A1 | 1/2006 | Aramata et al. | |
| 2011/0244333 A1* | 10/2011 | Kawada | H01M 4/131 429/231.8 |
| 2012/0231326 A1* | 9/2012 | Biswal | C23C 14/0605 429/163 |
| 2013/0071750 A1 | 3/2013 | Park et al. | |
| 2014/0302396 A1 | 10/2014 | Lu et al. | |

FOREIGN PATENT DOCUMENTS

| | | | | |
|---|---|---|---|---|
| EP | 2778130 A1 * | 9/2014 | ............. | H01M 4/36 |
| JP | 2002-255530 A | 9/2002 | | |
| JP | 2005-56705 A | 3/2005 | | |
| JP | 2006-19127 A | 1/2006 | | |
| JP | 2008-282819 A | 11/2008 | | |
| JP | 4967839 | 4/2012 | | |
| JP | 5000979 | 5/2012 | | |
| JP | 2007-273484 A | 8/2012 | | |
| JP | 2012-151129 A | 8/2012 | | |
| JP | 2012-178269 A | 9/2012 | | |
| JP | 2012-256539 | 12/2012 | | |
| JP | 2013-69674 A | 4/2013 | | |
| WO | 2013/067956 A1 | 5/2013 | | |
| WO | 2015/145522 A1 | 10/2015 | | |

OTHER PUBLICATIONS

European Office Action dated Dec. 17, 2015 from corresponding European Patent Application No. 14 182 255, 8 pages.

Hu et al.; "Superior Storage Performance of a Si@SiOx/C Nannocomposite as Anode Material for Lithium-Ion Batteries", Angew. Chem. Int. Ed., 2008, 47, pp. 1645-1649.

Saint et al.; "Towards a Fundamental Understanding of the Improved Electrochemical Performance of Silicon-Carbon Composites", Adv. Fund. Mater., 2007, 17, pp. 1765-1774.

European Search Report dated Jan. 9, 2015 from corresponding EP Application No. 14182255.1, 11 pages.

Hu et al.; "Superior Storage Performance of a Si@SiOx/C Nanocomposite as Anode Material for Lithium-Ion Batteries" Angewandte Chemie International Edition, 2008, vol. 47, pp. 1645-16549.

Chinese First Office Action dated May 3, 2016 from corresponding Chinese Patent Application No. 2014104578063, 13 pages.

Japanese Decision to Grant a Patent dated Oct. 3, 2017 from corresponding Japanese Patent Application No. 2013-195036, 6 pages.

* cited by examiner

ELECTRODE MATERIAL FOR NONAQUEOUS ELECTROLYTE SECONDARY BATTERY, ELECTRODE FOR NONAQUEOUS ELECTROLYTE SECONDARY BATTERY, AND NONAQUEOUS ELECTROLYTE SECONDARY BATTERY

CROSS-REFERENCE TO RELATED APPLICATION

This application is based upon and claims the benefit of priority from Japanese Patent Application No. 2013-195036, filed on Sep. 20, 2013; the entire contents of which are incorporated herein by reference.

FIELD

Embodiments described herein relate to an electrode material for nonaqueous electrolyte secondary battery, an electrode for nonaqueous electrolyte secondary battery, a nonaqueous electrolyte secondary battery, and a battery pack.

BACKGROUND

In recent years, with rapid spread of small mobile terminals represented by smart phones and tablets, a demand for small batteries having high energy density, which drive the small mobile terminals, is increasing.

Currently, a graphite-based material is used for negative electrodes of many lithium ion batteries. A theoretical capacity of the graphite-based material is 372 mAh/g ($LiC_6$), and currently, the graphite-based material is used near the limit. Since a negative electrode material is a reducing agent, a material having a potential as low as possible, strong reducing power, and small electrochemical equivalent is favorable. Therefore, elements alloyed with lithium, such as silicon and tin, which have a second lowest potential after carbon and lithium, and high capacity density, amorphous chalcogen compounds, and the like have drawn attention as the negative electrode materials for next-generation lithium ion battery.

Among them, silicon can store lithium atoms up to the ratio of 4.4 to one silicon atom, and can theoretically have the capacity about ten times that of the graphite-based carbon. However, there are problem that, when a silicon particle stores lithium, its volume is increased to about three to four times, and especially, when the particle size is large, the particle is cracked and pulverized. Meanwhile, it is known that, when the size of the silicon particle is nano-sized, adjacent particles are united and cause grain growth with passage of a charge/discharge cycle, and cyclability is considerably decreased. Therefore, typically, measures of coating the surface of the silicon particle with a carbonaceous material, and the like are performed. However, this coating is coating a solid with a solid, and thus adhesive properties are not sufficient. A method of coating the periphery of a silicon particle with silicon carbide that has good bonding properties with silicon is known. While a silicon carbide coating layer suppresses volume expansion, and improves the cyclability, the silicon particles are made by pulverization, and the size is relatively large and the ratio occupied by silicon carbide in the coated particles is large. If the surface of the silicon particle is coated with the silicon carbide layer in a thick manner, the coating layer hinders movement of lithium and may impair an electrochemical reaction. Accordingly, there is a problem that sufficient charge/discharge characteristics cannot be obtained.

DETAILED DESCRIPTION

Figure 1:
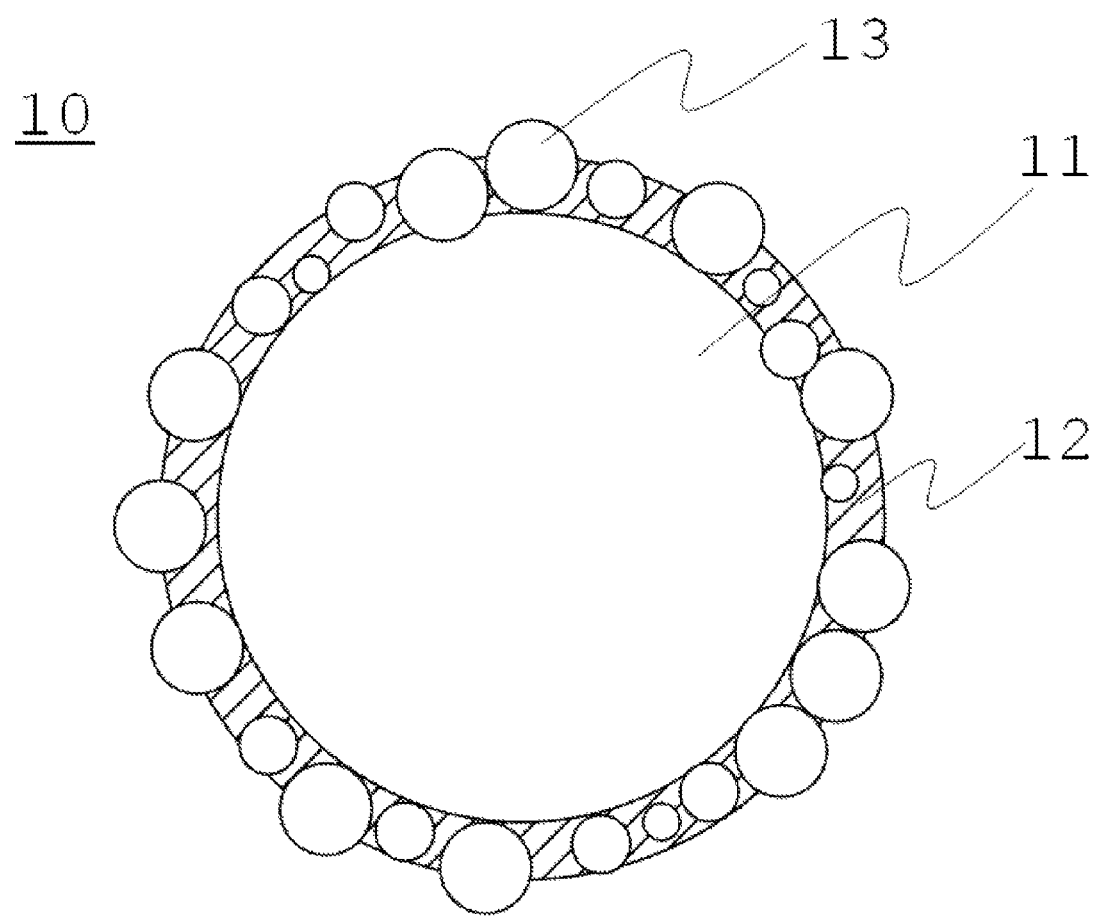
FIG. 1 is a conceptual diagram of a negative electrode material of an embodiment.

An electrode material for nonaqueous electrolyte secondary battery of an embodiment includes a silicon nanoparticle, and a coating layer coating the silicon nanoparticle. The coating layer includes an amorphous silicon oxide and a silicon carbide phase. At least a part of the silicon carbide phase exists on a surface of the silicon nanoparticle.

An electrode for nonaqueous electrolyte secondary battery of an embodiment includes a current collector and a negative electrode material for nonaqueous electrolyte secondary battery. An electrode active material layer including the electrode material, a conductive assistant, and a binder is on the current collector. The electrode material includes a carbonaceous substance phase, a silicon nanoparticle included in the carbonaceous substance phase, and a coating layer coating the silicon nanoparticle. The coating layer includes an amorphous silicon oxide and a silicon carbide phase. At least a part of the silicon carbide phase exists on a surface of the silicon nanoparticle.

A nonaqueous electrolyte secondary battery of an embodiment includes a separator, a positive electrode on one surface of the separator, a negative electrode on the other surface of the separator, and a nonaqueous electrolyte. The negative electrode or the positive electrode includes a current collector, and an electrode material for nonaqueous electrolyte secondary battery. An electrode active material layer including the electrode material, a conductive assistant, and a binder is on the current collector. The electrode material includes a carbonaceous substance phase, a silicon nanoparticle included in the carbonaceous substance phase, and a coating layer coating the silicon nanoparticle. The coating layer includes an amorphous silicon oxide and a silicon carbide phase. At least a part of the silicon carbide phase exists on a surface of the silicon nanoparticle.

A battery pack of an embodiment uses a nonaqueous electrolyte secondary battery as a cell. The nonaqueous electrolyte secondary battery includes a separator, a positive electrode on one surface of the separator, a negative electrode on the other surface of the separator, and a nonaqueous electrolyte. The negative electrode or the positive electrode includes a current collector, and an electrode material for nonaqueous electrolyte secondary battery. An electrode active material layer including the electrode material, a conductive assistant, and a binder is on the current collector. The electrode material includes a carbonaceous substance phase, a silicon nanoparticle included in the carbonaceous substance phase, and a coating layer coating the silicon nanoparticle. The coating layer includes an amorphous silicon oxide and a silicon carbide phase. At least a part of the silicon carbide phase exists on a surface of the silicon nanoparticle.

Therefore, as a result of diligent study, the inventors have found out a negative electrode material for nonaqueous electrolyte secondary battery especially excellent in cycle characteristics, the negative electrode material including: a silicon nanoparticle; and a coating layer that coats the silicon nanoparticle, the coating layer including an amorphous silicon oxide and a silicon carbide phase, and at least a part of the silicon carbide phase existing on a surface of the silicon nanoparticle. The electrode material (the negative electrode material) may be used for a positive electrode material.

Hereinafter, embodiments will be described with reference to the drawings.

First Embodiment

A schematic diagram of a basic structure of a negative electrode material according to an embodiment is illustrated in FIG. 1. A negative electrode material 10 of FIG. 1 includes a silicon nanoparticle 11, a silicon oxide 12, and a silicon carbide 13, and has a form in which the silicon nanoparticle 11 serves as a core, and the core is coated with the silicon oxide 12 and the silicon carbide 13. The negative electrode material 10 of the first embodiment is a negative electrode active material. Following embodiment shows the electrode material is used for a negative electrode material. The electrode material of the embodiment may be used for a negative electrode material or a positive electrode material.

The silicon nanoparticle 11 stores/releases a large amount of lithium. The silicon nanoparticle 11 serves as a core of the negative electrode material 10. Every time the silicon nanoparticle 11 stores and releases lithium, silicon of the silicon nanoparticle 11 causes large volume change. Stress of the volume change may cause deterioration, such as pulverization of the negative electrode material. Therefore, to relax the stress, it is favorable to use the silicon nanoparticle 11 having a size as fine as possible. To be specific, an average primary particle diameter is favorably from 10 to 100 nm. Silicon having the average primary particle diameter less than 10 nm has strong aggregation, and dispersion is difficult. Further, too fine silicon is easily oxidized, and a decrease in capacity may be caused. Meanwhile, with regard to silicon having the average primary particle diameter larger than 100 nm, the silicon particle itself is cracked and pulverization is more likely to occur due to repetition of volume expansion/contraction.

The average primary particle diameter of the silicon nanoparticle can be measured by a method as follows, for example.

First, the secondary battery is decomposed, the negative electrode is taken out, and a part of the obtained negative electrode is made flat using ion milling. The flat part is observed with a field emission-scanning electron microscope (FE-SEM) at the magnification of 50,000 times. Since an obtained view is square, primary particle diameters of 10 biggest silicon nanoparticles on the diagonal line are measured. As a particle diameter, an average value of the maximum diameter (long diameter) and the minimum diameter (short diameter) of one silicon nanoparticle to be measured is employed, and an average of 10 average values is employed as an average primary particle diameter. Note that, when measurement is performed with the FE-SEM, more clear measurement is possible by use of a result in the reflected electron beam.

90% or more of elements that constitute the silicon nanoparticle 11, that is, the main component of the silicon nanoparticle 11 is silicon, and a part of the silicon nanoparticle 11 may contain elements, such as B, F, N, Sb, Al, and the like. Further, the silicon nanoparticle 11 may be crystalline or amorphous. While the silicon nanoparticle 11 may be manufactured by a method, such as pulverization of the silicon particles, it is more favorable to produce the silicon nanoparticle 11 by a vapor phase cooling method using plasma or a laser thermal decomposition method. Further, a spherical shape is more favorable than shapeless. It is more favorable that a particle surface portion of the silicon nanoparticle 11 has a structure having high crystallinity, and stacking faults may be contained inside the silicon nanoparticle 11. A part of the surface of the silicon nanoparticle 11 is bound with the silicon oxide 12. A composition of the negative electrode material of an embodiment can be measured by a powder X-ray diffraction method and inductively coupled plasma mass spectrometry.

Most of the silicon oxide 12 contained in the coating layer of the silicon nanoparticle 11 is non-crystalline silicon oxide. The silicon oxide 12 may include a crystalline silicon oxide phase. The silicon oxide 12 may contain lithium silicate in addition to the silicon oxide. It is favorable that the silicon oxide 12 coats the surface portion of the silicon nanoparticle 11 with the thickness of 10 nm or less on average. The silicon oxide 12 coats almost the entire surface of the silicon nanoparticle 11 (note that the silicon oxide 12 does not exist in an interface where the silicon nanoparticles are bonded, and there is little portion on the surface where silicon is directly exposed). Form observation of the negative electrode material of the embodiment can be performed using transmission electron microscope.

Since most portion of the silicon oxide 12 is amorphous, the silicon oxide 12 has relaxation capability even if lithium enters and the volume is expanded at the time of charging. Further, the silicon oxide 12 can prevent growth of the silicon particles in the charge/discharge cycle. The silicon oxide 12 reacts with lithium ions and becomes a layer containing lithium silicate having lithium ion conductivity at the time of charging/discharging. Therefore, its existence is favorable. If the silicon oxide 12 is thicker than necessary, the thickness may cause a decrease in the charge/discharge capacity per negative electrode material mass, and an increase in an irreversible capacity, that is, a decrease in initial charge/discharge efficiency. Further, the silicon oxide 12 may contain a carbonaceous phase, or may be united with the silicon oxide 12 to constitute an amorphous Si—C—O composition layer.

The silicon carbide 13 included in the coating layer of the silicon nanoparticle 11 is a silicon carbide phase having crystallinity. A part of the silicon carbide 13 is bonded with the silicon nanoparticle 11 on the surface of the silicon nanoparticle 11. The silicon carbide 13 exists on a part of the surface of the silicon nanoparticle 11, and does not cover all of the surface of the silicon nanoparticle 11. The silicon carbide 13 is granular. The particle of the silicon carbide 13 may independently exist, or the particles may be formed such that the particles are connected in one direction or in a plurality of directions. It is favorable to have a structure with gaps, into which the lithium ions easily enter, through an electrolyte solution, rather than a structure in which the entire surface of the silicon nanoparticle is coated with the compact silicon carbide 13. The silicon oxide 12 is included in the gaps.

Further, a part of the silicon carbide 13 may get into the silicon nanoparticle 11. Further, a part of the silicon carbide 13 may be exposed outside from the coating layer. Rather, since silicon carbide has conductivity, the silicon carbine has more changes to come in contact with a separately added conductive assistant. Therefore, it is effective to improve the charge/discharge capacity. Further, by having contact with a surrounding conductive material, the silicon carbide 13 serves to maintain formation of a conductive path for repetitive charging/discharging. Further, the silicon carbide does not store/release lithium at the time of charging/discharging. Therefore, the silicon carbide can suppress the volume expansion of the silicon nanoparticle 11. Further, the silicon carbide can prevent uniting/aggregation of the silicon nanoparticles 11 due to repetition of the charge/discharge reaction, and can enhance the cyclability.

(Manufacturing Method)

Next, a method of manufacturing a nonaqueous secondary battery negative electrode material according to the first embodiment will be described. With regard to the negative electrode material according to the first embodiment, first, carbon coating treatment is applied to the silicon nanoparticle as an ingredient by a gas phase method using an organic hydrocarbon gas, a method of coating the silicon nanoparticle with an organic carbon precursor and applying heat treatment, or the like. The method of coating with carbon is not limited to the above methods, and a method capable of forming a film as uniformly as possible is favorable. As a carbon coating amount, a range from 0.2 to 20 mass %, with respect to the silicon nanoparticle is favorable. When the carbon coating amount is smaller than 0.2 mass %, effect of inclusion of the silicon carbide is not exhibited, and thus it is not favorable. Further, when the carbon coating amount exceeds 20 mass %, the coating becomes ununiform, and inclusion of the silicon carbide advances more than necessary, resulting in a decrease in the capacity, and thus it is not favorable.

Further, as for a condition of the heat treatment, it is favorable to perform the heat treatment in an inert gas atmosphere under atmospheric pressure at a temperature from 900 to 1400° C. More favorably, the temperature is from 1000 to 1200° C. The inert gas atmosphere here refers to in vacuum, an atmosphere containing Ar, $N_2$, or hydrogen, or a mixed gas atmosphere of Ar, $N_2$, or hydrogen. In the heat treatment process, a part of coating carbon and the silicon nanoparticles are caused to react, and generation of the silicon carbide phase is performed. When the heat treatment temperature is lower than 900° C., the silicon carbide phase is not generated. While the temperature is higher than 1400° C., silicon is dissolved. Therefore, both temperatures (too high and too low) are inappropriate.

Second Embodiment

Figure 2:
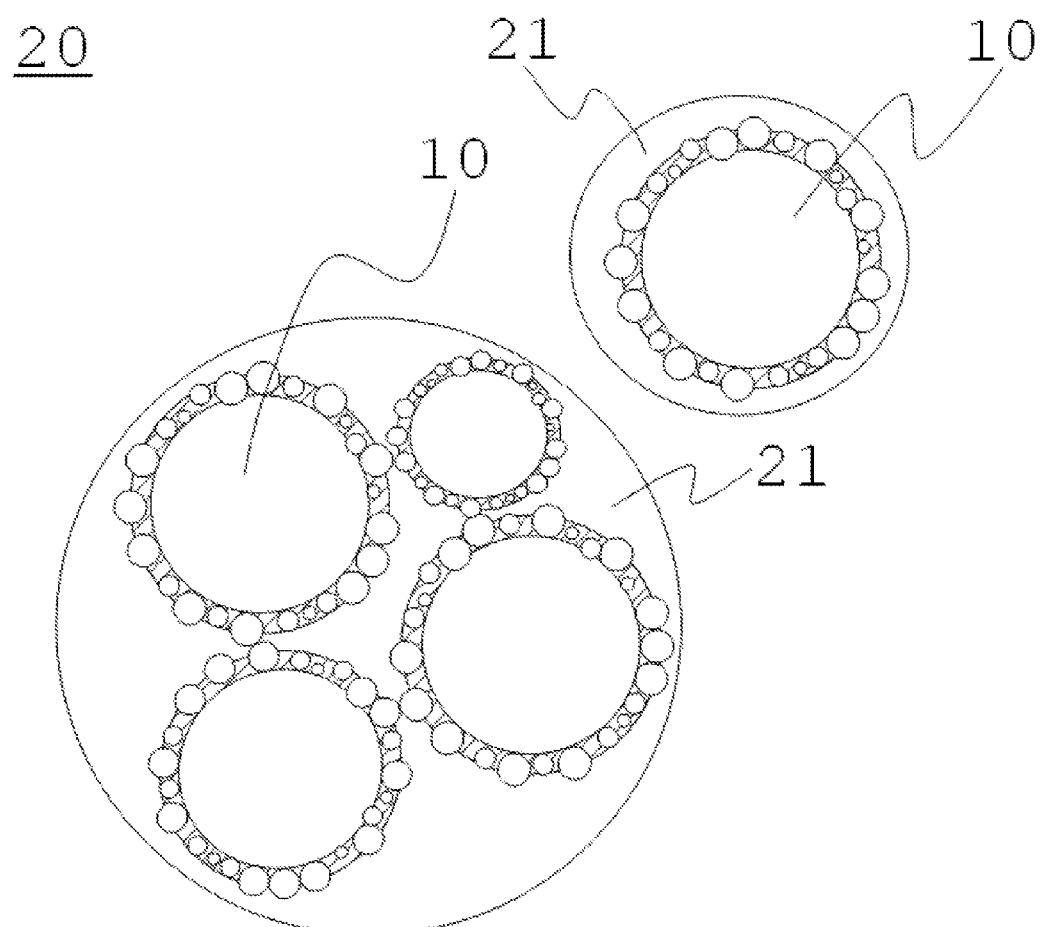
FIG. 2 is a conceptual diagram of composite particles of an embodiment.

A negative electrode material of a second embodiment is a composite negative electrode material 20 that is a composite of a negative electrode material 10 of the first embodiment and a carbonaceous substance phase 21. A conceptual diagram of a cross section of the composite negative electrode material of the second embodiment is illustrated in FIG. 2. The composite negative electrode material 20 of FIG. 2 includes the negative electrode material 10 and a carbonaceous substance layer including the negative electrode material 21. Following embodiment shows a negative electrode that the electrode material of the first embodiment is used. The electrode of the second embodiment may be used for a negative electrode or a positive electrode.

The negative electrode material 10 of the first embodiment can be included in the carbonaceous substance phase 21 and can be used as a composite material.

Alternatively, a silicon nanoparticle is included in the carbonaceous substance phase, and a silicon carbide phase can be formed on a surface layer portion of the silicon nanoparticle by heat treatment of a manufacturing process.

In this case, coating with the carbonaceous substance phase 21 may be performed to a single negative electrode material 10, or may be performed to a particle having a composite structure in which a plurality of negative electrode materials 10 is concurrently included (hereinafter, referred to as composite particle). A part of the negative electrode material 10 may be exposed on a surface of the carbonaceous substance 21. In such a composite particle 20, by dispersing of a plurality of negative electrode materials 10 in the structure body, the carbonaceous substance phase 21 works as a buffer phase that relaxes stress, and can prevent pulverization and drop out of an active material. Further, the carbonaceous substance phase 21 is a favorable conductive material, and thus contributes to improvement of a charge/discharge capacity and efficiency.

As the carbonaceous substance 21 added in the composite negative electrode material 20 together with the negative electrode material 10, at least one type selected from graphite, hard carbon, soft carbon, amorphous carbon, and acetylene black, more favorably, a mixture of graphite and hard carbon is employed. Graphite is favorable in enhancement of the conductivity of the active material and improvement of the capacity, and hard carbon has profound effect to cover the entire active material and to relax expansion/contraction.

Further, carbon fiber may be included in the composite negative electrode material 20 in order to maintain the structure, to prevent aggregation of the negative electrode material 10, and to secure conductivity. An average diameter of the carbon fiber to be added is favorably from 10 to 1000 nm. The content of the carbon fiber favorably falls within a range from 0.1 to 8 mass %. If the content exceeds 8 mass %, the specific surface area is large, and thus more of the carbonaceous substance phase that covers the carbon fiber is required. As a result, the silicon content is decreased, and thus it is not favorable. More favorably, the content of the carbon fiber is from 0.5 to 5 mass %.

Further, lithium silicate such as $Li_4SiO_4$ may be dispersed inside the carbonaceous substance phase 21 in the composite negative electrode material 20 or on a surface of the negative electrode material 10. A Lithium salt added to the carbonaceous substance performs a solid reaction with a silicon oxide phase inside the composite particle by heat treatment, and can form lithium silicate.

A $SiO_2$ precursor and a Li compound may be added in the composite negative electrode material 20. By adding of these substances to the carbonaceous substance 21, binding between the silicon oxide 12 on the surface and the carbonaceous substance 21 becomes strong, and $Li_4SiO_4$ having excellent Li ion conductivity can be generated in the silicon oxide phase. An example of the $SiO_2$ precursor includes alkoxide, such as silicon ethoxide. Examples of the Li compound include lithium carbonate, lithium oxide, lithium hydroxide, lithium oxalate, or lithium chloride.

An average particle diameter of the composite negative electrode material 20 favorably falls within a range from 0.5 to 50 μm. If the average particle diameter is smaller than 0.5 μm, the specific surface area becomes large, and a large volume of binder is required by the area in formation of an electrode. If the average particle diameter is larger than 50 µm, an unintended space is formed at the formation of an electrode, resulting in a decrease in the capacity per volume. Therefore, the specific surface area of the composite particle favorably falls within a range from 0.5 to 100 m$^2$/g. The particle diameter and the specific surface area of the composite particle that serves as an active material have influence on a reaction speed of insertion/detachment of lithium, and have large influence on negative electrode characteristics. However, when the particle diameter and the specific surface area have values within the ranges, the characteristics can be stably exhibited.

The specific surface area can be obtained by measuring of an absorption amount using a nitrogen gas absorption method and of a weight of an object to be measured.

Regarding a ratio of a silicon phase and the carbonaceous substance phase in the composite particle, the molar ratio of silicon and carbon favorably falls within a range of $0.2 \leq Si/carbon \leq 1$. If the ratio falls within the range, a large capacity and favorable cycle characteristics can be obtained as a negative electrode active material.

(Composite Forming Processing)

Next, a method of forming a composite of the negative electrode material 10 with the carbonaceous substance 21 will be described.

In composite forming processing, the negative electrode material 10 and an organic material made of a carbon material, such as graphite, and a carbon precursor are mixed to form a composite. Mixing can be performed using a continuous ball mill, a planetary ball mill, or the like.

As the organic material, at least one type of a carbon material, such as graphite, coke, low-temperature sintered carbon, pitch, and a carbon material precursor can be used. Especially, a material like pitch that is melted by being heated is melted during dynamic mill processing, and forming of a composite does not favorably advance. Therefore, such material is favorably mixed and used with coke or graphite, which is not melted.

A method of forming a composite by mixture and stirring in a liquid phase will be described below. The mixture/stirring processing can be performed by various stirring devices, a ball mill, a bead mill device, or a combination thereof. For the forming of a composite of the silicon nanoparticle coated with the silicon carbide, the carbon precursor, and the carbonaceous material, it is favorable to perform liquid phase mixture in a liquid using a dispersion medium. This is because dispersion is more uniformly performed. As the dispersion medium, an organic solvent, water, or the like can be used. It is favorable to use a liquid having affinity for both of the silicon nanoparticle and the carbon precursor, and the carbonaceous material. Specific examples of the dispersion medium include ethanol, acetone, isopropyl alcohol, methyl ethyl ketone, and ethyl acetate.

Further, the carbon precursor soluble to a liquid or the dispersion medium at the mixture stage is favorable so as to be uniformly mixed with the silicon nanoparticle coated with the silicon carbide, and it is especially favorable if the carbon precursor is a monomer or an oligomer that is a liquid and is easily polymerizable. Examples of the carbon precursor include organic materials that form a furan resin, a xylene resin, a keton resin, an amino resin, a melamine resin, a urea resin, an aniline resin, an urethane resin, a polyimide resin, a polyester resin, a phenol resin, and a resol resin. The materials mixed in the liquid phase forms a silicon nanoparticle coated with carbon-organic material composite compound through a curing or drying process.

(Carbonizing and Sintering Processing)

Carbonizing and sintering is performed in an inert atmosphere, such as in Ar. In the carbonizing and sintering, a carbon precursor such as a polymer or pitch in the silicon nanoparticle coated with the silicon carbide-organic material composite compound is carbonized. A proper range of the temperature of the carbonizing and sintering is favorably from 700 to 1200° C., although it depends on a thermal decomposition temperature of the organic material compound to be used. Although it depends on the particle diameter of the silicon nanoparticle to be used, if the temperature is higher than 1200° C., the carbonized carbon and the silicon nanoparticle react with each other to further generate silicon carbide, and may cause a decrease in the capacity. Therefore, it is not favorable. The sintering time is favorably about between 10 minutes and 12 hours although it depends on the temperature of the sintering.

With the above-described composite method, the negative electrode material according to the present embodiment can be obtained. The particle diameter, the specific surface area, and the like of the product after the carbonizing and sintering are prepared using various mills, a pulverizing device, a grinder, or the like.

It has been confirmed that the negative electrode material according to the first embodiment and the composite negative electrode material according to the second embodiment described above have diffraction peaks at $2\theta=28.4°$ and $2\theta=35.6°$ in powder X-ray diffraction measurement. The peak of $2\theta=28.4°$ is derived from the silicon oxide. The peak of $2\theta=35.6°$ is derived from the silicon carbide phase. By use of such a negative electrode active material, a large charge/discharge capacity and a long cycle life can be achieved at the same time. Therefore, a long life nonaqueous electrolyte secondary battery with an improved discharge capacity can be realized.

Third Embodiment

A nonaqueous electrolyte secondary battery according to a third embodiment will be described.

A nonaqueous electrolyte secondary battery according to the third embodiment includes an exterior member, a positive electrode housed in the exterior member, a negative electrode including an active material and spatially separated from the positive electrode and housed in the exterior member, through a separator, for example, and a nonaqueous electrolyte filled in the exterior member.

Figure 3:
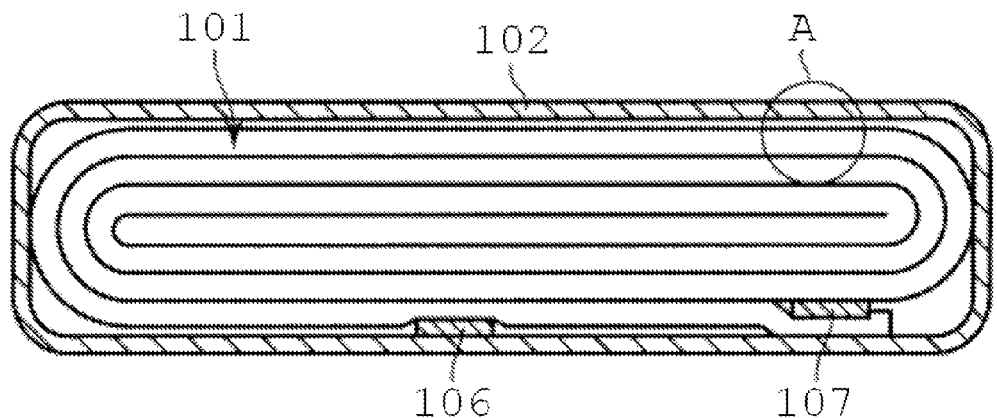
FIG. 3 is a conceptual diagram of a flat nonaqueous electrolyte battery of an embodiment.
Figure 4:
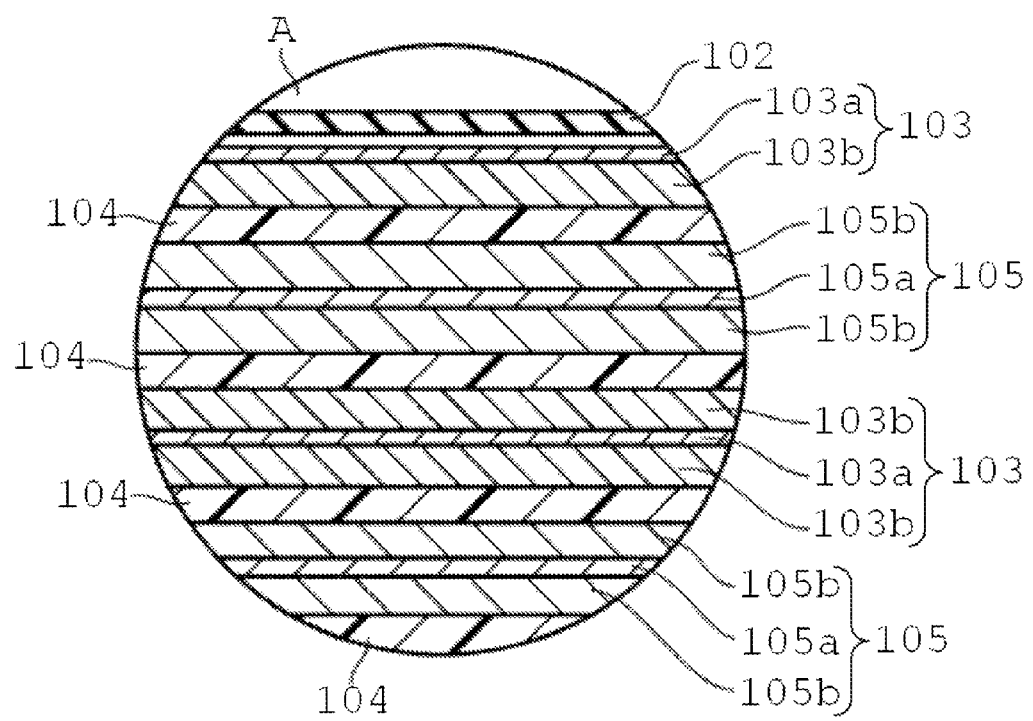
FIG. 4 is an enlarged conceptual diagram of the A portion of FIG. 3.

An example of a nonaqueous electrolyte secondary battery 100 according to the embodiment will be described in more detail with reference to FIGS. 3 and 4. FIG. 3 is a schematic diagram of a cross sectional view of the flat nonaqueous electrolyte secondary battery 100 in which an exterior member 102 is made of a laminated film, and FIG. 4 is an enlarged cross sectional view of the A portion of FIG. 3. Note that these drawings are schematic diagrams for description, and there are some portions having different shapes, dimensions, ratios, or the like from an actual device. However, design of the shapes and the like can be appropriately changed in consideration of the description below and known technologies.

A flat wound electrode group 101 is housed in the bag-like exterior member 102 made of a laminated film that interposes an aluminum foil between two resin layers. The flat wound electrode group 101 is formed such that a laminated product in which a negative electrode 103, a separator 104, a positive electrode 105, and a separator 104 are laminated in this order is wound in a spiral manner and is press molded. As illustrated in FIG. 4, the outermost negative electrode 103 has a configuration in which a negative electrode layer 103b is formed on one inner surface of a negative electrode current collector 103a. Other portions of the negative electrode 103 are configured such that the negative electrode layer 103b is formed on both surface of the negative electrode current collector 103a. An active material in the negative electrode layer 103b contains the active material for battery according to the first embodiment. The positive electrode 105 is configured such that a positive electrode layer 105b is formed on both surfaces of a positive electrode current collector 105a.

In the vicinity of an outer peripheral end of the wound electrode group 101, a negative electrode terminal 106 is electrically connected to the negative electrode current collector 103a of the outermost negative electrode 103, and a positive electrode terminal 107 is electrically connected to the positive electrode current collector 105a of the innerside positive electrode 105. These negative electrode terminal 106 and positive electrode terminal 107 extend outside through an opening of the bag-like exterior member 102. For example, a liquid nonaqueous electrolyte is injected through the opening of the bag-like exterior member 102. The opening of the bag-like exterior member 102 is heat-sealed while sandwiching the negative electrode terminal 106 and the positive electrode terminal 107, so that the wound electrode group 101 and the liquid nonaqueous electrolyte are completely sealed.

An example of the negative electrode terminal 106 includes aluminum or an aluminum alloy containing elements such as Mg, Ti, Zn, Mn, Fe, Cu, and Si. To reduce contact resistance with the negative electrode current collector 103a, the material of the negative electrode terminal 106 is favorably similar to that of the negative electrode current collector 103a.

As the positive electrode terminal 107, a material having electrical stability and conductivity in a range of a potential to a lithium ion metal being 3 to 4.25 V can be used. To be specific, aluminum or an aluminum alloy containing elements such as Mg, Ti, Zn, Mn, Fe, Cu, and Si can be used. To reduce the contact resistance with the positive electrode current collector 105a, the material of the positive electrode terminal 107 is favorably similar to that of the positive electrode current collector 105a.

Hereinafter, the exterior member, the positive electrode, the negative electrode, the electrolyte, and the separator that are configuration members of the nonaqueous electrolyte secondary battery 100 will be described in detail.

1) Exterior Member

The exterior member 102 is formed of a laminated film having the thickness of 0.5 mm or less. Alternatively, as the exterior member 102, a metal container having the thickness of 1.0 mm or less is used. The metal container favorably has the thickness of 0.5 mm or less.

The shape of the exterior member 102 can be selected from a flat type (thin type), a square type, a cylindrical type, a coin type, and a button type. Examples of the exterior member 102 include a small battery exterior member mounted on mobile electronic devices and the like, and a large battery exterior member mounted on two-wheeled to four-wheeled automobiles and the like, according to dimensions of the battery.

As the laminated film, a multilayer film interposing a metal layer between resin layers is used. The metal layer is favorably an aluminum foil or an aluminum alloy foil for weight reduction. As the resin layer, a polymeric material, such as polypropylene (PP), polyethylene (PE), nylon, or polyethylene terephthalate (PET), can be used, for example. The laminated film can be formed into the shape of the exterior member by sealing with heat seal.

The metal container is made of aluminum or an aluminum alloy. The aluminum alloy is favorably an alloy containing elements, such as magnesium, zinc, and silicon. When a transition metal, such as iron, copper, nickel, or chromium, is contained in the alloy, the amount of the transition metal is favorably 100 mass ppm or less.

2) Positive Electrode 105

The positive electrode has a structure in which the positive electrode active material layer 105b including an active material is carried on one surface or both surfaces of the positive electrode current collector 105a. The electrode of the second embodiment may be used as the positive electrode.

The thickness of one surface of the positive electrode active material layer 105b favorably falls within a range from 10 to 150 μm, because of retention of large current discharge characteristics and the cycle life of the battery. Therefore, when the positive electrode active material layers 105b are carried on the both surfaces of the positive electrode current collector, the total thickness of the positive electrode active material layers 105b favorably falls within a range from 20 to 300 μm. A more favorable range of the one surface is from 30 to 120 μm. If the thickness falls within this range, the large current discharge characteristics and the cycle life are improved.

The positive electrode active material layer 105b may include a conductive agent in addition to the positive electrode active material.

The positive electrode active material layer 105b may include a binder that binds the positive electrode materials.

As the positive electrode active material, various oxides, such as a manganese dioxide, a lithium-manganese composite oxide, a nickel cobalt oxide containing lithium (for example, $LiCOO_2$), a nickel cobalt oxide containing lithium (for example, $LiNi_{0.8}CO_{0.2}O_2$), a lithium-manganese composite oxide (for example, $LiMn_2O_4$, $LiMnO_2$), can be used because a high voltage can be obtained.

Examples of the conductive agent include acetylene black, carbon black, and graphite.

Specific examples of the binder, polytetrafluoethylene (PTFE), polyvinylidene fluoride (PVdF), ethylene-propylene-diene copolymer (EPDM), or styrene-butadiene rubber (SBR) can be used, for example.

Regarding the mixing proportions of the positive electrode active material, the conductive agent, and the binder, it is favorable that the positive electrode active material falls within a range from 80 to 95 mass %, the conductive agent falls within a range from 3 to 18 mass %, and the binder falls within a range from 2 to 7 mass %, because favorable large current discharge characteristics and cycle life can be obtained.

As the current collector, a conductive substrate having a porous structure or nonporous conductive substrate can be used. The thickness of the current collector is desirably from 5 to 20 μm. If the thickness falls within the range, electrode strength and weight reduction can be balanced.

The positive electrode 105 is manufactured such that the active material, the conductive agent, and the binder are suspended in a general-purpose solvent to prepare slurry, and the slurry is applied to the current collector 105a, dried, and then applied a press. Alternatively, the positive electrode 105 may be manufactured such that the active material, the conductive agent, and the binder are formed into a pellet to form the positive electrode layer 105b, and this layer is formed on the current collector 105a.

3) Negative Electrode 103

The negative electrode 103 has a structure in which the negative electrode active material layer 103b including a negative material is carried on one surface or both surfaces of the negative electrode current collector 103a. As the negative electrode active material, the composite negative electrode material according to the second embodiment can be used.

The thickness of the negative electrode active material layer 103b is desirably from 10 to 150 μm. Therefore, when the negative electrode active material layers 103b are carried on both surfaces of the negative electrode current collector 103a, the total thickness of the negative electrode active material layer 103b falls within a range from 20 to 300 μm. A more favorable range of the thickness of one surface is from 30 to 100 μm. If the thickness falls within this range, the large current discharge characteristics and the cycle life are remarkably improved.

The negative electrode active material layer 103b may include a binder that binds the negative electrode materials. Examples of the binder include polytetrafluoethylene (PTFE), polyvinylidene fluoride (PVdF), ethylene-propylene-diene copolymer (EPDM), styrene-butadiene rubber (SER), polyimide, and polyaramide. Further, as the binder, a combination of two or more types may be used, and when a combination of a binder excellent in the binding between the active materials and a binder excellent in binding between the active material and the current collector 103a, or a combination of a binder having high hardness and a binder having flexibility is used, a negative electrode excellent in the life characteristics can be manufactured.

Further, the negative electrode active material layer 103b may include a conductive agent. Examples of the conductive agent include acetylene black, carbon black, and graphite.

As the current collector 103a, a conductive substrate having a porous structure or a nonporous conductive substrate can be used. These conductive substrates can be formed of copper, stainless steel, or nickel, for example. The thickness of the current collector 103a is desirably from 5 to 20 μm. If the thickness falls within the range, electrode strength and weight reduction can be balanced.

The negative electrode 103 is manufactured such that the active material, the conductive agent, and the binder are suspended in a general-purpose solvent, and slurry is prepared. The slurry is applied to the current collector 103a, dried, and then applied a press. Alternatively, the negative electrode 103 may be manufactured such that the active material, the conductive agent, and the binder are formed into a pellet to form the negative electrode layer 103b, and this layer is formed on the current collector 103a.

4) Electrolyte

As the electrolyte, a nonaqueous electrolyte solution, an electrolyte impregnated polymer electrolyte, a polymeric electrolyte, or an inorganic solid electrolyte can be used.

The nonaqueous electrolyte solution is a liquid electrolyte solution prepared such that an electrolyte is dissolved in a nonaqueous solvent, and is held in gaps in an electrode group.

As the nonaqueous solvent, it is favorable to use a nonaqueous solvent mainly including a mixture solvent of propylene carbonate (PC) or ethylene carbonate (EC), and a nonaqueous solvent (hereinafter, referred to as second solvent) having lower viscosity than PC or EC.

As the second solvent, chain carbon is favorable, for example. Examples of the chain carbon include dimethyl carbonate (DMC), methyethyl carbonate (MEC), diethyl carbonate (DEC), ethyl propionate, methyl propionate, γ-butyrolactone (BL), acetonitrile (AN), ethyl acetate (EA), toluene, xylene, and methyl acetate (MA). These second solvents may be used alone or in a form of a mixture of two or more types of the solvents. Especially, it is more favorable that the second solvent has the donner number of 16.5 or less.

The viscosity of the second solvent is favorably 2.8 cmp or less at 25° C. The mixing amount of ethylene carbonate or propylene carbonate in the mixture solvent is favorably 1.0% to 80%, in volume ratio. A more favorable mixing amount of the ethylene carbonate or propylene carbonate is from 20% to 75%, in volume ratio.

Examples of the electrolyte contained in the nonaqueous electrolyte solution include lithium salts (electrolytes), such as lithium perchlorate ($LiClO_4$), lithium hexafluorophosphate ($LiPF_6$), Lithium Tetrafluoroborate ($LiBF_4$), lithium hexafluoro arsenate ($LiAsF_6$), lithium trifluoromethanesulfonate ($LiCF_3O_3$), and lithium bis(trifluoromethanesulfonimide) [$LiN(CF_3SO_2)_2$]. Among them, it is favorable to use $LiPF_6$ or $LiBF_4$.

A dissolving amount of the electrolyte to the nonaqueous solvent is desirably from 0.5 to 2.0 mol/L.

5) Separator 104

When the nonaqueous electrolyte solution is used, and when the electrolyte impregnated polymer electrolyte is used, the separator 104 can be used. As the separator 104, a porous separator is used. As a material for the separator 104, for example, a porous film containing polyethylene, polypropylene, or polyvinylidene difluoride (PVdF), a nonwoven fabric made of a synthetic resin, or the like can be used. Among them, a porous film made of polyethylene, polypropylene, or both of them is favorable because safety of the second battery can be improved.

The thickness of the separator 104 is favorably 30 μm or less. If the thickness exceeds 30 μm, the distance between the positive and negative electrodes becomes large, and internal resistance may become large. Further, a lower limit of the thickness is favorably 5 μm. If the thickness is less than 5 μm, the strength of the separator 104 is significantly decreased, and internal short circuit may be easily caused. An upper limit of the thickness is favorably 25 μm, and the lower limit is favorably 1.0 μm.

The separator 104 favorably has thermal shrinkage of 20% or less when the separator 104 is left for one hour in a condition of 120° C. When the thermal shrinkage exceeds 20%, a possibility of occurrence of short circuit due to heating becomes large. The thermal shrinkage is favorably 15% or less.

Porosity of the separator 104 is favorably in a range from 30% to 70%. This is because of the following reasons. If the porosity is less than 30%, it may become difficult to obtain high electrolyte retention in the separator 104. Meanwhile, if the porosity exceeds 70%, sufficient strength of the separator 104 may not be obtained. A more favorable range of the porosity is from 35% to 70%.

The separator 104 favorably has air permeability of 500 seconds/100 $cm^3$ or less. If the air permeability exceeds 500 seconds/100 $cm^3$, it becomes difficult for separator 104 to obtain high lithium ion mobility. Further, a lower limit of the air permeability is 30 seconds/100 $cm^3$. If the air permeability is less than 30 seconds/100 $cm^3$, sufficient strength of the separator 104 may not be obtained.

An upper limit of the air permeability is favorably 300 seconds/100 cm³, and the lower limit is more favorably 50 seconds/100 cm³.

Further, the nonaqueous electrolyte secondary battery can be applied to a nonaqueous electrolyte air battery provided with a positive electrode, a negative electrode, a nonaqueous electrolyte, a case including an air hole for supplying oxygen to the positive electrode, and the like.

Fourth Embodiment

Next, a battery pack according to a fourth embodiment will be described.

A battery pack according to the fourth embodiment includes one or more nonaqueous electrolyte secondary batteries (that is, single batteries) according to the above-described embodiment. The single batteries are used as cells of the battery pack. When the battery pack includes a plurality of single batteries, the single batteries are electrically connected and arranged in series, in parallel, or in series and in parallel.

A battery pack 200 will be described in detail with reference to the conceptual diagram of FIG. 5 and the block diagram of FIG. 6. In the battery pack 200 illustrated in FIG. 5, a flat nonaqueous electrolyte solution battery 100 illustrated in FIG. 3 is used as a single battery 201.

The plurality of single batteries 201 configures an assembled battery 205 such that a negative electrode terminal 202 and a positive electrode terminal 203 extending outside are layered to be arranged in the same direction, and are fastened with an adhesive tape 204. These single batteries 201 are electrically connected with each other in series, as illustrated in FIG. 6.

A print circuit board 206 is arranged facing a side surface of the single batteries 201 into which the negative electrode terminal 202 and the positive electrode terminal 203 extend. On the print circuit board 206, as illustrated in FIG. 6, a thermistor 207, a protection circuit 208, and a current carrying terminal 209 to an external device are mounted. Note that an insulating plate (not illustrated) is attached to a surface of the print circuit board 206 facing the assembled battery 205 in order to avoid unnecessary connection with wiring of the assembled battery 205.

A positive electrode-side lead 210 is connected to the positive electrode terminal 203 positioned at a lowermost layer of the assembled battery 205, and its tip is inserted into and electrically connected to a positive electrode-side connector 211 of the print circuit board 206. A negative electrode-side lead 212 is connected to the negative electrode terminal 202 positioned at an uppermost layer of the assembled battery 205, and its tip is inserted into and electrically connected to a negative electrode-side connector 213 of the print circuit board 206. These connectors 211 and 213 are connected to the protection circuit 208 through wiring 214 and 215 formed on the print circuit board 206.

The thermistor 207 is used for detecting the temperature of the single battery 201, and its detection signal is transmitted to the protection circuit 208. The protection circuit 208 can cut off plus-side wiring 216a and minus-side wiring 216b between the protection circuit 208 and the current carrying terminal 209 to an external device in a predetermined condition. The predetermined condition is, for example, a time when a detection temperature of the thermistor 207 becomes a predetermined temperature or more. Further, the predetermined condition is a time when overcharge, over discharge, overcurrent, or the like of the single battery 201 is detected. This detection of overcharge or the like is performed about individual single battery 201 or the single batteries 201 as a whole. When the individual single battery 201 is detected, a battery voltage may be detected, or a positive electrode potential or a negative electrode potential may be detected. In the latter case, a lithium electrode used as a reference electrode is inserted into individual batteries 201. In the case of FIGS. 5 and 6, wiring 217 for detecting a voltage is connected to each of the single batteries 201, and a detection signal is transmitted to the protection circuit 208 through these pieces of wiring 217.

Protection sheets 218 made of rubber or a resin are arranged on three side surfaces of the assembled battery 205, respectively, excluding a side surface through which the positive electrode terminal 203 and the negative electrode terminal 202 protrude.

The assembled battery 205 is housed in a housing container 219 together with the protection sheets 218 and the print circuit board 206. That is, the protection sheets 218 are arranged on both inner surfaces in a long side direction of the housing container 219 and on an inner surface in a short side direction, and the print circuit board 206 is arranged on an opposite-side inner surface in the short side direction. The assembled battery 205 is positioned in a space surrounded by the protection sheets 218 and the print circuit board 206. A lid 220 is attached on an upper surface of the housing container 219.

Note that, for fixation of the assembled battery 205, a thermal shrinkable tape may be used instead of the adhesive tape 204. In this case, the protection sheets are arranged on both side surfaces of the assembled battery, a thermal shrinkable tape is wound and is then thermally shrunk, and the assembled battery is fixed.

Figure 5:
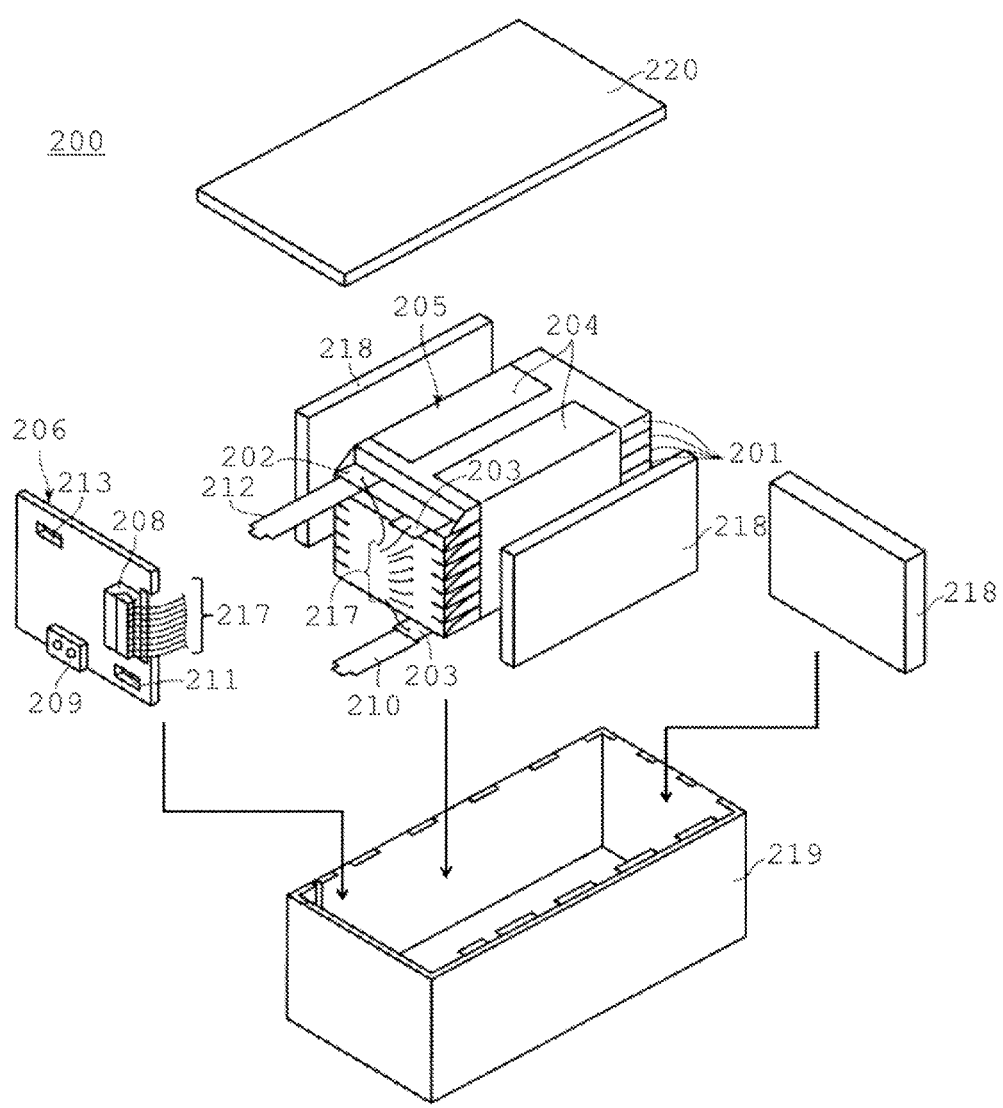
FIG. 5 is a conceptual diagram of a battery pack of an embodiment.
Figure 6:
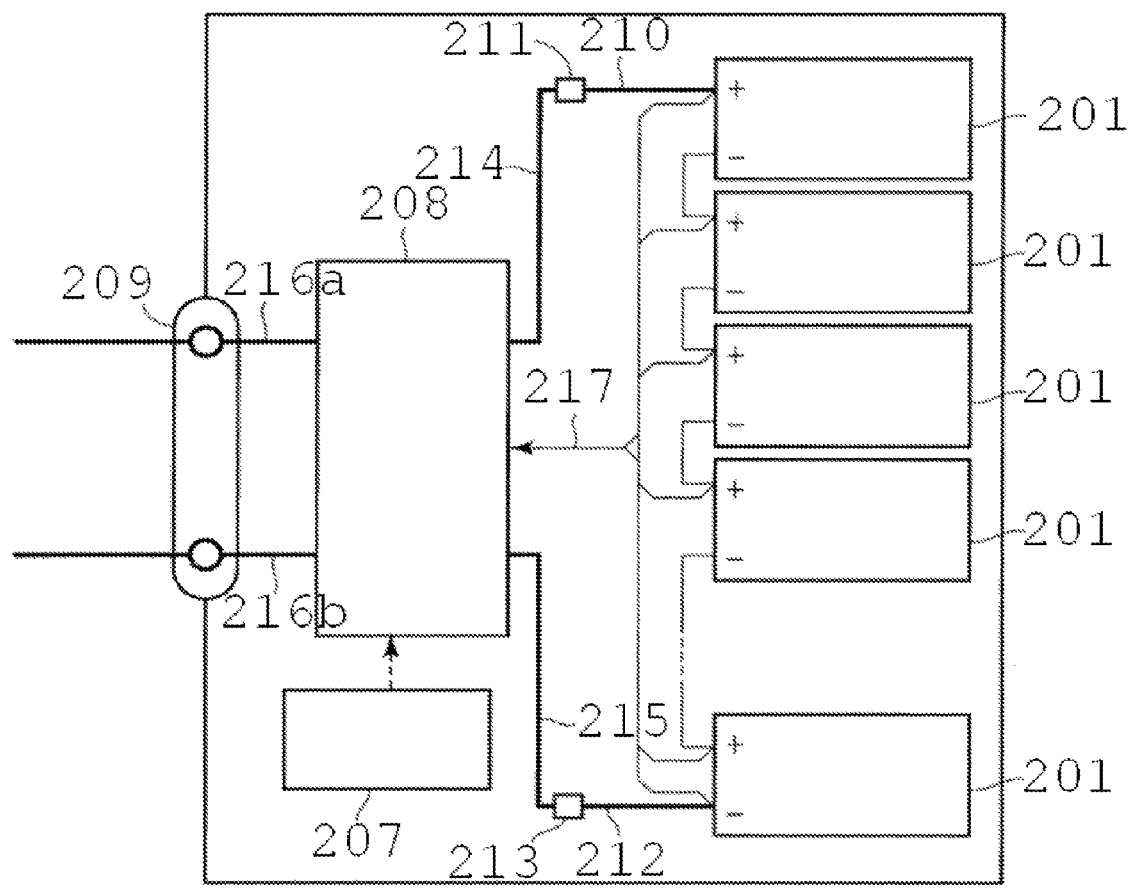
FIG. 6 is a block diagram illustrating an electrical circuit of a battery pack of an embodiment.

While FIGS. 5 and 6 illustrate a form in which the single batteries 201 are connected in series. However, to increase the battery capacity, the single batteries may be connected in parallel, or series connection and parallel connection may be combined. The assembled battery packs may be further connected in series or in parallel.

According to the above-described present embodiment, with the nonaqueous electrolyte secondary battery having excellent charge-discharge cycle performance in the embodiment, a battery pack having excellent charge-discharge cycle performance can be provided.

Note that the form of the battery pack is appropriately changed according to its use. Use of the battery pack requiring a small size and a large capacity is favorable. To be specific, examples of the use include a battery pack for digital camera power source, and on-vehicle battery packs for two-wheeled to four-wheeled hybrid electric automobile, for two-wheeled to four-wheeled electric automobile, and for assist bicycle.

Hereinafter, specific examples (examples in which the battery described with reference to FIG. 3 is specifically created in each condition described in each example) will be given, and its effects will be described. Note that an example is not limited to the examples below.

Example 1

Silicon nanoparticle coated with silicon carbide was produced in the following condition.

Commercially available spherical silicon nanoparticles (the average diameter 80 nm) were used. A sucrose solution adjusted to have 0.2 mass % of the carbon amount with respect to 2 g of the silicon nanoparticle was mixed with the silicon nanoparticles, uniformly stirred in a kneading device, then heated to 120° C. to evaporate the solution part, and cured. The obtained silicon nanoparticles coated with a carbon precursor were subjected to heat treatment for one hour at 1200° C. in an Ar atmosphere, the carbon precursor was carbonized by thermal decomposition, further carbon and a surface portion of the silicon nanoparticles were caused to react, and the silicon nanoparticles subjected to surface coating processing were obtained.

Next, the obtained silicon nanoparticles subjected to the surface coating processing and graphite powder of 3 μm are caused to form a composite with hard carbon by the following method.

1.2 g of the silicon nanoparticles subjected to surface coating processing and 0.3 g of graphite powder were added to mixed liquor of 2.4 g of furfuryl alcohol and 20 g of ethanol. The mixed liquid was mixed with a planetary mixer, and was made into slurry. 0.5 g of a dilute hydrochloric acid that serves as a polymerization catalyst of the furfuryl alcohol was added to the mixture, left at room temperature, dried, and cured, and a carbon composite was obtained. The obtained carbon composite was sintered at 1100° C. for 3 hours in an Ar gas atmosphere, cooled to the room temperature, and then pulverized and sieved with a sieve having a diameter of 45 μm. A negative electrode active material was obtained under the sieve.

(Charge/Discharge Test)

12 mass % of graphite having the average diameter of 3 μm, and 16 mass % of polyimide were mixed with an obtained sample using N-methylpyrrolidone as a dispersion medium, and the mixture was applied on a copper foil having the thickness of 12 μm, dried and roll-pressed, and then subjected to heat treatment at 400° C. for 2 hours in an Ar gas. The sample was cut into a predetermined size, vacuum dried at 100° C. for 12 hours, and used as a sample electrode. A battery in which a counter electrode and a reference electrode were metal Li, and an electrolyte solution was an EC/DEC (volume ratio EC:DEC=1:2) solution of $LiPF_6$ (1M) was produced in an Ar atmosphere, and a charge/discharge test was performed. A condition of the charge/discharge test was such that charging was performed with current density of 2 $mA/cm^2$ until a potential difference between the reference electrode and the test electrode became 0.01 V, constant voltage charging was performed with 0.01 V for 16 hours, and discharging was performed with the current density of 1 $mA/cm^2$ until 1.5 V. Further, a cycle of charging with the current density of 1 $mA/cm^2$ until the potential difference between the reference electrode and the test electrode became 0.01 V, and discharging with the current density of 1 $mA/cm^2$ until 1.5 V was performed 50 times, and a maintenance percentage of the discharge capacity of the 50th cycle to the first cycle was measured.

Table 1 was made regarding Examples and Comparative Examples. Regarding Examples and Comparative Examples below, only different portions from Example 1 will be described, and other synthesis and evaluation procedures were similarly performed to Example 1, and thus description is omitted.

Example 2

A sample was produced and a charge/discharge test was performed, similarly to Example 1, except that the amount of carbon coating to silicon nanoparticles was 5 mass % in carbon coating as pretreatment.

Example 3

A sample was produced and a charge/discharge test was performed, similarly to Example 1, except that the amount of carbon coating to silicon nanoparticles was 20 mass % in carbon coating as pretreatment.

Example 4

A sample was produced and a charge/discharge test was performed, similarly to Example 1, except that the amount of carbon coating to silicon nanoparticles was 5 mass %, and the temperature of initial heat treatment was 1050° C. in carbon coating as pretreatment.

Example 5

A sample was produced and a charge/discharge test was performed, similarly to Example 1, except that silicon nanoparticles coated with silicon carbide was produced where the amount of carbon coating to silicon nanoparticles was 5 mass %, and the temperature of initial heat treatment was 1200° C. in carbon coating as pretreatment, and the temperature of composite forming processing afterward was 900° C.

Example 6

A sample was produced and a charge/discharge test was performed, similarly to Example 1, except that carbon coating as pretreatment was not performed, and composite forming processing was performed at 1100° C.

Comparative Example 1

A sample was produced and a charge/discharge test was performed, similarly to Example 1, except that carbon coating as pretreatment was not performed, and composite forming processing was performed at 900° C.

Example 7

Silicon nanoparticle coated with silicon carbide was produced in the following condition. (an example in which carbon coating was performed by a gas phase method is added.)

Commercially available spherical nanoparticles (the average diameter 80 nm) was used, and a sample was heated under flow of methane-argon gas with a heat CVD device, heated to 1200° C., and subjected to carbon coating processing for 30 minutes. Accordingly, silicon nanoparticles subjected to surface coating processing were obtained. Then, a charge/discharge test was performed, similarly to Example 1.

Comparative Example 2

A sample was produced and a charge/discharge test was performed, similarly to Example 1, except that carbon coating as pretreatment was not performed, and composite forming processing was performed at 1200° C.

X-ray diffraction measurement after carbon coating heat treatment and structure observation with a high resolution electron microscope were performed with respect to the negative electrode material obtained in Example 2.

Figure 7:
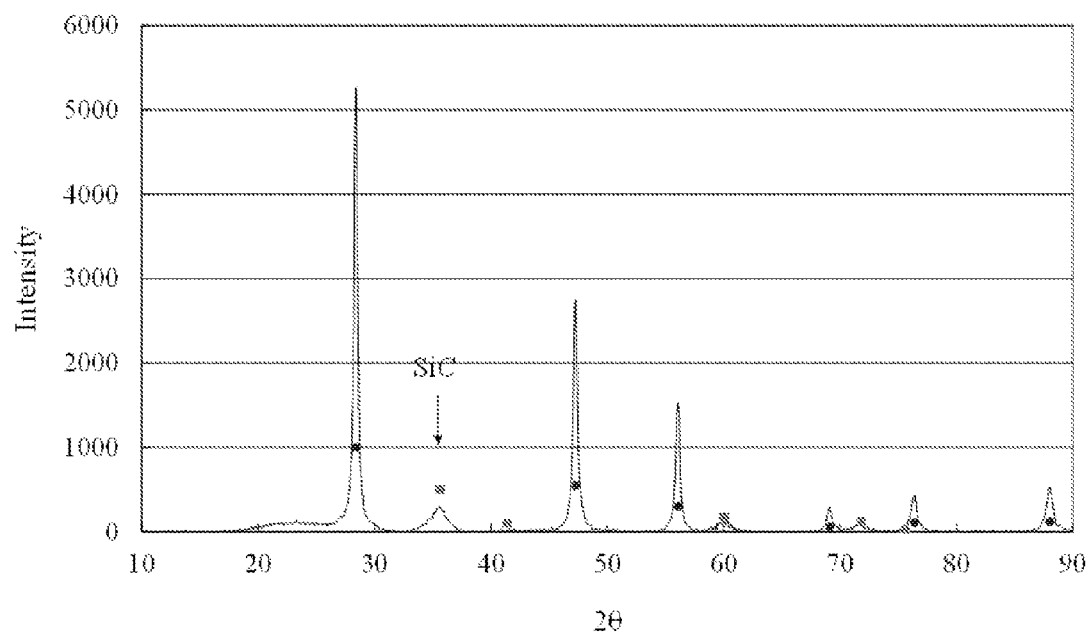
FIG. 7 is an X-ray diffraction analysis result of a negative electrode material of an example.

FIG. 7 illustrates a result of powder X-ray diffraction of powder after being coated with carbon and subjected to heat treatment according to the present embodiment. A peak of silicon carbide was confirmed together with a peak caused by silicon. Further, existence of an amorphous silicon oxide phase probably existing on a surface portion was seen around 2θ=20° to 30°.

From the structure observation with a high resolution electron microscope, no considerable change of the particle size of the silicon nanoparticle was confirmed. When the surface portion of the silicon nanoparticle was enlarged, an amorphous layer of silicon oxide that covers the surface of the particle was observed. The thickness was from 2 to 3 nm. In this layer, a phase of crystalline silicon carbide that can be seen as particles having sizes of about 1 to 5 nm in the form of being in contact with the silicon nanoparticle was observed. A part of the silicon carbide exists exposing from the silicon oxide layer.

Results of Examples and Comparative Examples are shown in Table 1. The existence of the silicon carbide phase in Table 1 is a result obtained from the powder X-ray diffraction of the coated particle obtained after the silicon nanoparticle was coated with carbon and subjected to heat treatment.

TABLE 1A

|  | Carbon Coating Amount (mass %) | Pretreatment Temperature (° C.) | Existence of Silicon Carbide Phase after Pretreatment Existed |
| --- | --- | --- | --- |
| Example 1 | 0.2 | 1200 | Existed |
| Example 2 | 5 | 1200 | Existed |
| Example 3 | 20 | 1200 | Existed |
| Example 4 | 5 | 1050 | Existed |
| Example 5 | 5 | 1200 | Existed |
| Example 6 | 0 | — | NOT Existed |
| Comparative Example 1 | 0 | — | NOT Existed |
| Example 7 | 5 | 1200 | Existed |
| Comparative Example 2 | 0 | — | NOT Existed |

TABLE 1B

|  | Temperature of Composite Forming Processing (° C.) | Discharge Capacity (mAh/g) | Capacity Maintenance Percentage After 50 Cycles (%) |
| --- | --- | --- | --- |
| Example 1 | 1100 | 1720 | 88.7 |
| Example 2 | 1100 | 1772 | 93.5 |
| Example 3 | 1100 | 1650 | 91.3 |
| Example 4 | 1100 | 1680 | 92.3 |
| Example 5 | 900 | 1711 | 85.0 |
| Example 6 | 1100 | 1780 | 89.5 |
| Comparative Example 1 | 900 | 1828 | 55.4 |
| Example 7 | 1100 | 1811 | 93.2 |
| Comparative Example 2 | 1200 | 510 | 92.0 |

In all cases where the pretreatment temperature was 1200° C., generation of the silicon carbide phase was confirmed. Further, like Example 6, it was found out that, even if the silicon carbide phase was not formed in the pretreatment, the silicon carbide phase was generated by causing of the temperature of the forming composite processing with a carbonaceous substance to about 1100° C. However, as shown in Comparative Example 2, when the sample was heated to 1200° C. in a state where excessive carbon exists around the silicon nanoparticles like a composite, many of the silicon nanoparticles become silicon carbide, and as a result, the charge capacity was decreased to almost a charge capacity of carbon.

Further, it was found out that the cycle characteristics are substantially improved by forming of the amorphous silicon oxide around the silicon nanoparticle and the silicon carbide phase partially included in the silicon oxide at the same time. It was found out that the heat treatment of at least 1050° C. or more is necessary for forming silicon carbide of the coating layer, and the temperature of the heat treatment at the composite forming processing afterward needs to be suppressed to about 1100° C.

However, like Comparative Example 1, the sample in a state where the temperature of forming a composite was decreased to 900° C., and the silicon carbide phase was not formed at all, the cycle characteristics were substantially decreased while improvement of the capacity was seen due to characteristics of the carbonaceous substance material.

As described above, it was found out that the existence of an appropriate amount of the silicon carbide phase is effective for maintenance of a high capacity in a cycle.

In the specification, a part of elements is expressed by element symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode material for nonaqueous electrolyte secondary battery, comprising:
    a silicon nanoparticle; and
    a coating layer coating the silicon nanoparticle,
    wherein the coating layer that coats the silicon nanoparticle is included in a carbonaceous substance phase,
    wherein the coating layer includes an amorphous silicon oxide and a silicon carbide phase,
    wherein the silicon carbide phase is granular, and
    wherein the silicon carbide phase has a part that is granular and is entirely covered by the amorphous silicon oxide.

2. The electrode material according to claim 1, wherein the silicon nanoparticle has an average primary particle diameter from 10 to 100 nm.

3. The electrode material according to claim 1, wherein the coating layer includes a surface on which the amorphous silicon oxide and the silicon carbide phase are exposed.

4. The electrode material according to claim 1, wherein the coating layer has a thickness from 1 to 10 nm, on average.

5. The electrode material according to claim 1, wherein the silicon nanoparticle is entirely covered by a mixture including the amorphous silicon oxide and the silicon carbide phase.

6. The electrode material according to claim 1 wherein the silicon carbide phase has a part of that is granular and is not entirely covered with the amorphous silicon oxide that is in direct contact with the silicon nanoparticle.

7. An electrode for nonaqueous electrolyte secondary battery, comprising:
    a current collector; and an electrode material for nonaqueous electrolyte secondary battery, wherein an electrode active material layer including the electrode material, a conductive assistant, and a binder is on the current collector, wherein the electrode material includes a carbonaceous substance phase, a silicon nanoparticle included in the carbonaceous substance phase, and a coating layer coating the silicon nanoparticle, wherein the coating layer includes an amorphous silicon oxide and a silicon carbide phase, and wherein the coating layer which coats the silicon nanoparticle is included in a carbonaceous substance phase, wherein the silicon carbide phase is granular, and wherein the silicon carbide phase has a part that is granular and is entirely covered by the amorphous silicon oxide.

8. The electrode according to claim 7, wherein the silicon nanoparticle has an average primary particle diameter from 10 to 100 nm.

9. The electrode according to claim 7, wherein the coating layer includes a surface on which the amorphous silicon oxide and the silicon carbide phase are exposed.

10. The electrode according to claim 7, wherein the coating layer has a thickness from 1 to 10 nm, on average.

11. The electrode according to claim 7, wherein the silicon nanoparticle is entirely covered by a mixture including the amorphous silicon oxide and the silicon carbide phase.

12. The electrode according to claim 7, wherein the silicon carbide phase has a part of that is granular and is not entirely covered with the amorphous silicon oxide that is in direct contact with the silicon nanoparticle.

13. A nonaqueous electrolyte secondary battery comprising:
  a separator;
  a positive electrode on one surface of the separator;
  a negative electrode on another surface of the separator; and
  a nonaqueous electrolyte,
  wherein the negative electrode or the positive electrode includes a current collector, and an electrode material for nonaqueous electrolyte secondary battery, an electrode active material layer including the electrode material, a conductive assistant, and a binder is on the current collector, the electrode material includes a carbonaceous substance phase, a silicon nanoparticle included in the carbonaceous substance phase, and a coating layer coating the silicon nanoparticle, wherein the coating layer includes an amorphous silicon oxide and a silicon carbide phase, and wherein the coating layer which coats the silicon nanoparticle is included in a carbonaceous substance phase, wherein the silicon carbide phase is granular, and wherein the silicon carbide phase has a part that is granular and is entirely covered by the amorphous silicon oxide.

14. The battery according to claim 13, wherein the silicon nanoparticle has an average primary particle diameter from 10 to 100 nm.

15. The battery according to claim 13, wherein the coating layer includes a surface on which the amorphous silicon oxide and the silicon carbide phase are exposed.

16. The battery according to claim 13, wherein the coating layer has a thickness from 1 to 10 nm, on average.

17. The electrode material according to claim 1, wherein the silicon particle exists inside of the carbonaceous phase.

18. The electrode according to claim 7, wherein the silicon particle exists inside of the carbonaceous phase.

19. The battery according to claim 13, wherein the silicon nanoparticle is entirely covered by a mixture including the amorphous silicon oxide and the silicon carbide phase.

20. The battery according to claim 13, wherein the silicon carbide phase has a part of that is granular and is not entirely covered with the amorphous silicon oxide that is in direct contact with the silicon nanoparticle, and wherein the silicon particle exists inside of the carbonaceous phase.

* * * * *